March 6, 1962  R. B. FROST ETAL  3,024,046
COUPLINGS WITH PIPE GRIPPING MEANS FOR PLAIN END PIPE
Filed May 29, 1958  2 Sheets-Sheet 2
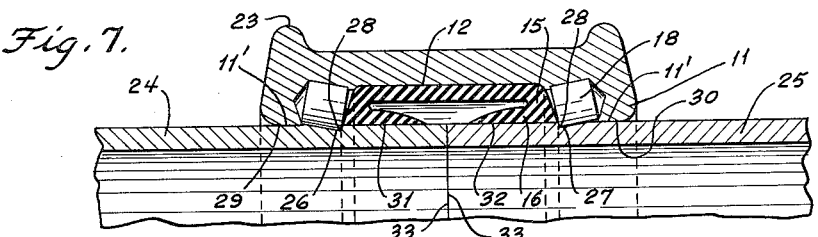
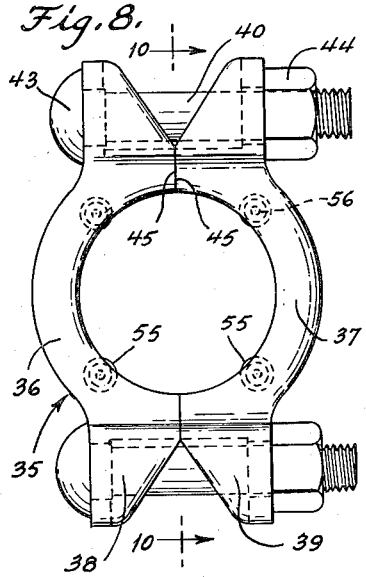
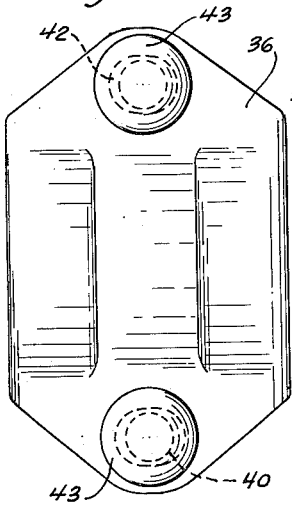
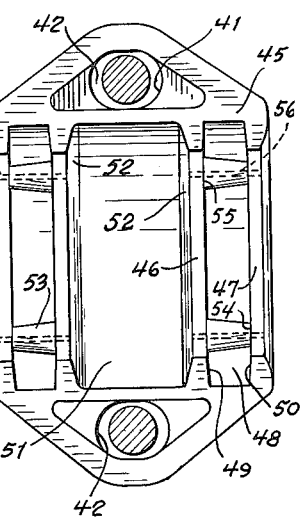
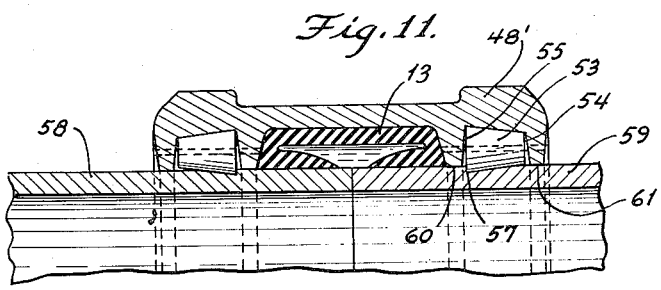
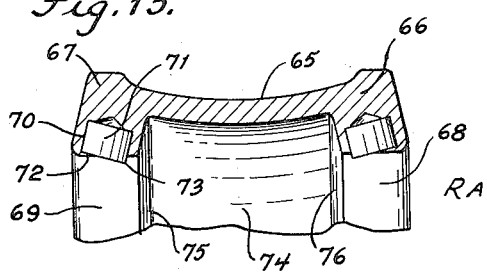
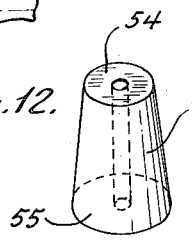
INVENTORS
RAYMOND B. FROST and
BY HARTSON J. SEXTON
ATTORNEY.

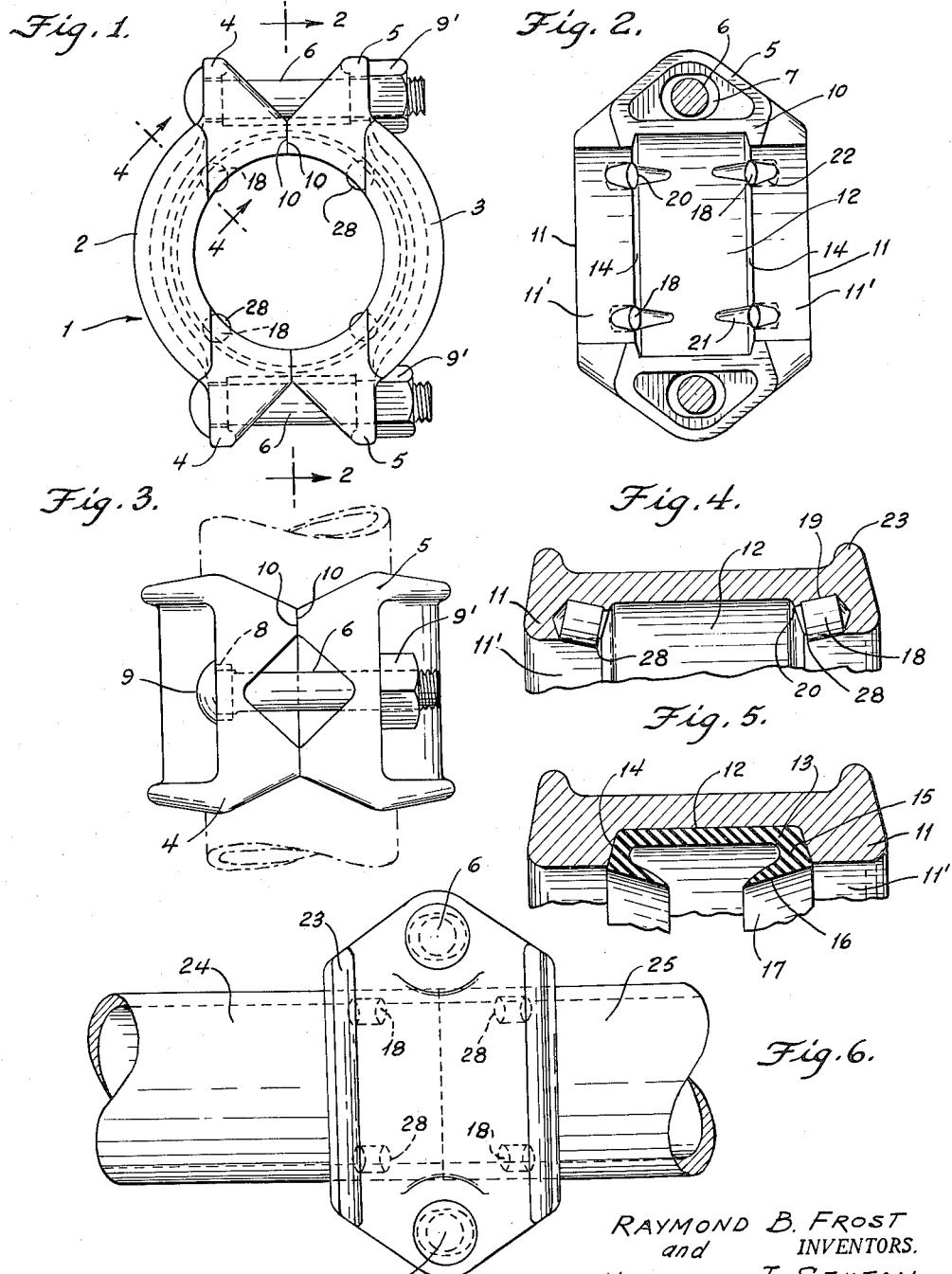

United States Patent Office 3,024,046
Patented Mar. 6, 1962

3,024,046
COUPLINGS WITH PIPE GRIPPING MEANS
FOR PLAIN END PIPE
Raymond B. Frost, Short Hills, and Hartson J. Sexton, Union, N.J., assignors to Victaulic Company of America, Union, N.J., a corporation of New Jersey
Filed May 29, 1958, Ser. No. 738,677
10 Claims. (Cl. 285—104)

This invention relates to pipe couplings and is particularly concerned with couplings for effecting leakproof joints between sections of plain end pipe, or, more specifically, between sections of pipe embodying no special end preparation for the engagement of couplings therewith.

In the coupling of pipe ends together without threading, a common practice has been to either groove the pipes adjacent the ends thereof, or apply shoulders thereto, for engagement with coupling housings. These housings commonly contain pressure responsive gaskets overlying the outer surfaces of the opposed pipes adjacent their ends. Such joining has proven most effective and satisfactory, particularly where some flexibility was desired at the joint.

Some couplings have been devised for joining pipes without any pipe end preparation, but none of them have been too satisfactory. They have either been too complicated in construction or application, have been incapable of adequately resisting the forces tending to pull the pipes apart, or in other respects have been commercially unacceptable.

The coupling of the instant invention changes all this and provides for a simple, economical coupling for plain end pipe which can be easily applied and with a minimum of force. Nevertheless, the coupling of the invention grips the pipe ends effectively and its effectiveness increases in direct response to the forces tending to pull the pipes apart. The holding action of the coupling on the pipes and the resistance against leakage by the action of the gasket fully complement each other, increasing together as the need of increase becomes manifest. These things have not heretofore been accomplished in plain end couplings.

It is accordingly, the principle object of the invention to provide effective plain end coupling of pipe sections.

Another object is to provide couplings which will effectively grip pipe surfaces without any special preparation of such surfaces.

Another object is to provide couplings for plain end pipe which are applicable effectively with the expenditure of a minimum of effort.

Still another object is to provide pressure responsive and self locking coupling of pipe ends in a most simple manner.

Still another object is to provide such coupling which increases in effectiveness with increase in pressure.

A further object is to provide such couplings which are fully effective in spite of wider tolerances between housing size and pipe size than heretofore thought possible.

A still further object is to provide couplings for plain end pipe which are simple and inexpensive to manufacture.

Further and more detailed objects of the invention will in part be obvious and in part be pointed out as the description of the invention taken in conjunction with the accompanying drawing proceeds.

In that drawing:

FIG. 1 is an end elevation of a coupling in accordance with the invention with the housings thereof secured in coupling position.

FIG. 2 is an interior view of one of the housings, omitting the gasket, and as seen from line 2—2 of FIG. 1 looking in the direction of the arrows.

FIG. 3 is a top plan view of the coupling as shown in FIG. 1 including a dot-dash showing of pipe ends secured therein.

FIG. 4 is a section taken on line 4—4 of FIG. 1 and looking in the direction of the arrows.

FIG. 5 is a similar view taken at a somewhat different position and showing the gasket in place in the housing channel.

FIG. 6 is a front elevation of a pipe joint in accordance with the invention.

FIG. 7 is a fragmentary transverse section of a joint employing a coupling housing in accordance with the invention, such section being taken through the pipe gripping elements of the coupling housing and showing those elements engaged with the pipe.

FIG. 8 is a view similar to FIG. 1 of a modification of the invention.

FIG. 9 is a front elevation thereof as viewed from the left hand side of FIG. 8.

FIG. 10 is an interior view of one of the housings with the gasket omitted therefrom and as seen from line 10—10 of FIG. 8.

FIG. 11 is a view similar to FIG. 7 but employing the modification of FIGS. 8-10.

FIG. 12 is a perspective view of one of pipe gripping elements of FIGS. 8–11 shown per se, and FIG. 13 is a view similar to FIG. 4 of a further modification of gripping means in accordance with the invention.

The coupling of the invention, generally indicated at 1, is made up of a pair of identical housings 2 and 3. A pair of housings is sufficient for the smaller pipe sizes, but when the pipe size exceeds about 12″ it is often desirable to form the complete coupling out of more than two sections, so the showing and description of two here is to be considered as illustrative and not limiting.

Each of the half housings, formed as short hemi cylindrical sections, are equipped at their ends with bolt pads 4 and 5 formed with openings therethrough to receive the securing bolt 6. Such openings 7 are non circular for the reception of a mated non circular enlargement 8 of the bolts 6 beneath their heads 9. In this way rotation of the bolts is prevented while the tightening nuts 9′ are taken up to tighten the half housings against each other. This tightening is properly achieved when the abutting radial faces 10 of the joined housings are brought together without any gap there between. The elimination of any gap here is important, for otherwise the pressure responsive gasket within the coupling will tend to be forced out between the end surfaces 10 allowing leakage to occur.

In the present instance it is to be noted that the openings 7 are located as close in toward the center of the coupling as possible. This enables the bolt to be positioned as close in as possible, enhances the strength of the coupling and enables it to be made of lighter weight than would otherwise be the case. At the same time, of course, it insures that the coupling will engage the pipe properly with the grips thereof biting into the pipe.

Turning now to FIGS. 2, 4, and 5, it will be seen that each of the identical half housings, being generally in the form of half cylinders, are formed with identical internally upstanding wide rib portions 11. These portions 11 are spaced apart axially of the housing and provide the borders for the intermediate gasket channel 12. This channel 12, as best seen in FIG. 5, is formed to properly receive and embrace a C cross section pressure responsive gasket 13 made out of suitable resilient material. The side walls 14 of the channel 12 are inclined from the base thereof outwardly, for the mated reception of the inclined sides 15 of the gasket. From the sides 15 the gasket extends inwardly in the flexible lips 16 whose under surface 17 forms generally a continuation of the inner surfaces 11' of the ribs 11 when the coupling is secured in place on pipe ends to be joined.

The means, hereinafter referred to as "grips," provided by the invention for holding the coupling housings in place on pipe sections and, contrariwise, for holding the pipe sections in coupled relationship, are in the form of small solid cylinders 18. As here shown, there are four of these grips in each half housing, two seated in each rib 11 and positioned, as seen by reference to FIG. 1, in equally spaced relation around the circumference of the complete coupling.

The grips 18 are seated in bores 19 drilled into the ribs 11 through the sides 14 thereof. These bores 19 are formed with their axes at a small angle with respect to the longitudinal axis of the coupling and the depth of the bores is limited with respect to the length of the cylinders 18 so that the inner lower edges 28 of the cylindrical grips where their ends and side faces meet protrude radially inwardly to a small extent with respect to the surfaces 11' of the ribs 11. Thus, where the surfaces 11' are formed on an I.D. the same as the O.D. of the pipes to be joined, the edges 28 will engage the surface of the pipes before the surfaces 11' do so.

As an example of the angle of the axis of the grips 18 with respect to the longitudinal axis of the coupling, for cylinders having a diameter of ⅜" an angle of approximately 11° gives excellent results. This size grip has been found to be effective for couplings of pipes in the range of from 1" to 4" in diameter. With larger sizes of pipes and couplings, therefore, the grip sizes should be increased. As an example here it has been found that when the pipe size reaches 6", grips of ½" diameter should be employed for best results.

The grips are maintained in place by peening over the metal of the rib 11 at the position 20 at the mouth of the bore 19 opposite the protruding edge 28 of the grip. The base of the gasket channel 12 is slightly recessed at 21 in alignment with the bores 19 to facilitate the drilling of the bores.

The illustration in FIG. 7 shows how the edges 28 dig into the outer surfaces 29 and 30 of the pipe sections 24 and 25. The edges 28 can be pressed into the pipe walls to sufficient exent for effective gripping with surprising ease as the couplings are tightened up to bring the end faces 10 of the coupling housings into engagement. A slight clearance would normally be present between the surfaces 11' and the outer surfaces 29 and 30 of the pipe, which in turn permit the end faces 10 of the coupling housings to come into engagement. Once the coupling is properly applied the greater the pressure within the pipe and the consequent greater tendency of the pipes to pull apart, the more the edges 28 will dig into the pipe and the greater the holding effect thereof.

The application and gripping of couplings in accordance with the invention onto pipes to be joined is achieved without any previous preparation of the pipes whatsoever. It is merely necessary to tighten down on the nuts 9' until the edges 28 begin to bite into the pipe and thereafter, as the pressure increases, edges bite further into the pipe and the gripping effect increases automatically. Whether the pipe ends 33 pull a short distance apart is not important, for pressure from within the pipe is communicated through the hollow in the gasket against the lips 16 thereof to tighten those lips against the surface portions 31 and 32 of the pipes.

The modified coupling of the invention shown generally at 35 in FIG. 8 is, again, made up of a pair of generally hemi cylindrical coupling housings 36 and 37 secured together by a bolt 40 passing through openings 41 in the bolt pads. The bolt head 43 engages the exterior of one of the pads while the nut 44 engages the exterior of the adjacent pad of the other half housing. Also the bolt 40 has a non circular enlargement of its shank beneath its head for mated engagement with the non circular outline of the opening 41. Likewise the bolt pads have radial engaging flat surfaces 45 which are brought into engagement when the coupling is properly tightened onto the pipes being coupled.

Here, as best seen in FIG. 10, the coupling housings at either side thereof are provided with internally extending pairs of narrow spaced ribs 46 and 47. These, like the wide ribs 11 of FIGS. 1–7 extend throughout the half circumferences of the half housings terminating in the radial end surfaces 45.

The ribs 46 and 47 form channels between them having a base 48 and side walls 49 and 50. Opposite these ribs the housings extend out in exterior strengthening bands 48' like the bands 23 seen in FIGS. 4 and 7. Frusto conical grips 53 bridge these channels at spaced positions therealong. These grips 53 having small ends 54 and large ends 55, with such large ends being positioned towards the center of the coupling housings. The grips 53 are held in place in the channels by means of pins 56 extending through the grips and being seated in the walls of the ribs 46, 47.

Normally, though not necessarily, the pins 56 are positioned to extend parallel to the axis of the coupling. Radially they are so located having regard to the size of the frusto conical elements 53 that the large ends 55 of the grips 53 extend upwardly a short distance above the inner circumferential face surfaces of the ribs 46 and 47. Thus, as best shown in FIGS. 8 and 11, portions of the corner edges of the grips 53 at the large ends 55 thereof extend radially inwardly in position to engage the surface of the pipes to be coupled the same as the inner edges 28 of the cylindrical grips 18. Here, then, rather than positioning cylindrical members at an incline, the incline effect is provided by the conical outline of the members 53 and the same effective gripping is achieved.

It is again to be noted from the FIG. 8 showing that the grips 53 are equally spaced around the circumference of the interior of the coupling formed by the pair of half housings.

The coupling gasket receiving channel is formed between the inner ones 46 of the pairs of ribs 46 and 47. It has a base 51 and side walls 52. The side walls 52 are suitably inclined for mating relationhsip with the sides of the gasket which, for the same size of coupling, is identical with that shown in the preferred form so carries the safe reference character.

Turning now to FIG. 11 it will be seen that when the coupling is properly applied to the pipes 58 and 59 to be joined, the lower edges at the inner ends of the frusto conical members 53 bite into the pipe at 57 while there is a slight clearance between the faces of the ribs 46 and 47 and the pipe surfaces at either side of the grips.

A further modification of the invention is illustrated in the fragment shown in FIG. 13. The coupling half housing as here shown has a center portion 65 bordered by annular enlarged portions 66 and 67 providing internal ribs 68 and 69. Here the wide ribs 68 and 69 are formed with bores 70 extending into the same at a small angle with respect to the radius of the coupling housing. These bores receive cylindrical grips 71 which are held therein by the peening over of the edge of the opening of the bore at 72. The grips 71 are so dimensioned and the angles of the bores receiving them are such that the inner edges 73 are exposed in position to dig into and grip the pipe in the same general manner as is done by the edges of the grips 18 and 53. This manner of mounting the grips, and the procedures involved in effecting the mounting are somewhat simplified over those of the prior forms and the gripping effect is also quite adequate for the intended purpose.

It will be clear to those skilled in this art that the practice of this invention lends itself readily to various other modifications. The preferred form and modifications disclosed herein are illustrative of effective arrangements for the coupling of plain end pipes in a simple and efficient manner.

Speaking more generally, it is to be understood that since certain changes may be made in the above product and different embodiments of the invention could be made without departing from the scope thereof, it is intended that all matter contained in the above description or shown in the accompanying drawing shall be interpreted as illustrative and not in a limiting sense.

Having described our invention, what we claim as new and desired to secure by Letters Patent is:

1. In coupling construction for plain end pipes, a coupling housing element formed of rigid material and forming a segment of a cylinder, said housing element being formed with radially inwardly extending portions presenting segmental cylindrical surfaces, a gasket mounting channel formed between said portions, said radially inwardly extending portions being formed with recesses extending thereinto through said segmental cylindrical surfaces, pipe engaging grips having portions fixedly secured in said recesses and having protruding edge portions extending out beyond said cylindrical surfaces in the form of segments of a circle on a substantially shorter radius than the radius of said segmental cylindrical surfaces, said protruding edge portions being the sole portions of said grips protruding outwardly from and with respect to said cylindrical surfaces, the surface portions of said grips opposite to said protruding edge portions being in rigid supporting contact with the surface of said recesses and said grips being formed with planar end surfaces and with inclined side surfaces, inclined with respect to the axis of said housing element, said inclined side surfaces inclining inwardly and downwardly from the ends of said housing and with respect to said segmental surfaces, said end surfaces and said side surfaces meeting at said protruding edge portions and said protruding edge portions being formed to bite into the surface of a pipe presented thereto.

2. Coupling construction as in claim 1 wherein said grips are formed as cylinders.

3. Coupling construction as in claim 1 wherein the material of said radially inwardly extending portions bordering said recesses is formed over said fixedly secured portions of said grips to secure said grips in said recesses.

4. In coupling contruction for plain end pipes, a coupling housing element forming a segment of a cylinder, said housing element being formed with radially inwardly extending portions presenting segmental cylindrical surfaces, a gasket mounting channel formed between said portions, and pipe engaging grips carried by and fixedly engaged by said portions and mounted to project radially inwardly with respect to said segmental cylindrical surfaces, said grips presenting protruding end edge portions departing from the contour of said segmental cylindrical surfaces, said grips being formed as cylinders and said radially inwardly extending portions of said housing element being formed with bores therein, said cylinders being seated in said bores and said protruding end edge portions protruding outwardly from said bores, the axes of said bores being on a small angle with respect to the axis of the cylinder of said housing element.

5. In coupling construction for plain end pipes, a coupling housing element forming a segment of a cylinder, said housing element being formed with radially inwardly extending portions presenting segmental cylindrical surfaces, a gasket mounting channel formed between said portions and pipe engaging grips carried by and fixedly engaged by said portions and mounted to project radially inwardly with respect to said segmental cylindrical surfaces, said grips presenting protruding end edge portions departing from the contour of said segmental cylindrical surfaces, said radially inwardly extending portions of said housing element being formed with grip receiving channels therein extending into the same from said segmental cylindrical surfaces and said grips being frusto conical members seated in said receiving channels and having portions of the bases thereof extending radially inwardly with respect to said segmental cylindrical surfaces to form said protruding end edge portions.

6. Coupling construction as in claim 5 wherein said frusto conical members are held in place in said receiving channels by pins extending axially of said members, said pins having their ends seated in the material of said extending portions at the sides of said receiving channels.

7. Coupling construction as in claim 6 wherein said pins extend substantially parallel with respect to the axis of the cylinder of said coupling housing element.

8. In coupling construction for plain end pipes, a coupling housing element forming a segment of a cylinder, said housing element being formed with radially inwardly extending portions presenting segmental cylindrical surfaces, a gasket mounting channel formed between said portions and pipe engaging grips carried by and fixedly engaged by said portions and mounted to project radially inwardly with respect to said segmental cylindrical surfaces, said grips presenting protruding end edge portions departing from the contour of said segmental cylindrical surfaces, said grips being in the form of cylinders and said radially inwardly extending portions of said elements being formed with bores therein extending thereinto from the cylindrical surfaces thereof, said bores receiving said grips in mated engagement therein, the axes of said bores being at a small angle with respect to the normal to the axis of the cylinder of said housing, and said protruding end edge portions of said grips each being formed as a segment of a circle established by the mating of the outer end of said grips with the side walls thereof.

9. In coupling construction for plain end pipes, a coupling housing substantially in the form of a short cylindrical member, said coupling housing being formed of a plurality of segments of said cylinder, each of said segments being formed with radially inwardly extending ribs at the sides thereof, said ribs presenting concavely curved segmental cylindrical surfaces, grips carried by said segments, means formed on said ribs for mounting said grips therein, said grips being carried by said mounting means and each of said grips being provided with a protruding end edge portion protruding radially inwardly from and with respect to said cylindrical surface, each of said protruding edge portions including a segment of a circle on a radius which is a fraction of the length of the radius of said segmental cylindrical surfaces and means for securing said cylindrical segments together to complete the cylinder of said housing, said circular segments of said grips extending convexly away from said concavely extending cylindrical surfaces of said ribs, said mounting means for said grips being in the form of bores extending into said ribs with the axes of said bores inclined inwardly and downwardly at a small angle from the ends of said housing with respect to the axis of said housing and said grips forming small cylinders fixedly secured in said bores and said protruding edge portions being sections of an edge of said cylinders.

10. In coupling construction for plain end pipes, a coupling housing substantially in the form of a short cylindrical member, said coupling housing being formed of a plurality of segments of said cylinder, each of said segments being formed with radially inwardly extending ribs at the sides thereof, said ribs presenting concavely curved segmental cylindrical surfaces, grips carried by said segments, means formed on said ribs for radially and immovably mounting said grips therein, said grips being fixedly and rigidly supported by said mounting means and each of said grips being provided with a protruding end edge portion formed by the meeting of two different surfaces at an angle to provide a biting edge for biting into the surface of a pipe presented thereto, said edge portion protruding radially inwardly from and with respect to said cylindrical surface, each of said protruding edge portions including a segment of a circle on a radius which is a fraction of the length of the radius of said segmental cylindrical surfaces, said circular segments of said grips extending convexly away from said concavely extending cylindrical surfaces of said ribs and being the sole portions of said grips extending away from said ribs, and means for securing said cylindrical segments together to complete the cylinder of said housing.

References Cited in the file of this patent
UNITED STATES PATENTS

| | | |
|---|---|---|
| 1,930,194 | Dillon | Oct. 10, 1933 |
| 2,005,056 | Stephens | June 18, 1935 |
| 2,225,208 | Crickmer | Dec. 17, 1940 |
| 2,449,795 | Stillwagon | Sept. 21, 1948 |
| 2,463,235 | Andrews | Mar. 1, 1949 |
| 2,473,046 | Adams | June 14, 1949 |
| 2,479,058 | Botting | Aug. 16, 1949 |
| 2,787,479 | Burns | Apr. 2, 1957 |